(12) United States Patent
Miyashita et al.

(10) Patent No.: US 8,873,972 B2
(45) Date of Patent: Oct. 28, 2014

(54) OPTICAL TRANSMISSION APPARATUS AND OPTICAL TRANSMISSION SYSTEM

(75) Inventors: Takuya Miyashita, Kawasaki (JP); Takashi Toyomaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 94 days.

(21) Appl. No.: 13/350,126

(22) Filed: Jan. 13, 2012

(65) Prior Publication Data

US 2012/0201534 A1    Aug. 9, 2012

(30) Foreign Application Priority Data

Feb. 3, 2011   (JP) ................................. 2011-021364

(51) Int. Cl.
*H04B 10/04* (2006.01)
*H04B 10/25* (2013.01)
*H04J 14/02* (2006.01)

(52) U.S. Cl.
CPC ............ *H04J 14/02* (2013.01); *H04J 14/0201* (2013.01); *H04B 10/25* (2013.01); *H04J 14/0221* (2013.01); *H04J 14/0212* (2013.01); *H04J 14/0279* (2013.01)
USPC ........................................ 398/195; 398/193

(58) Field of Classification Search
CPC .................................................. H04B 10/2572
USPC .................................................. 398/195, 193
See application file for complete search history.

(56) References Cited

U.S. PATENT DOCUMENTS

| 5,309,530 | A | 5/1994 | Bergano et al. |
| 6,529,316 | B1 * | 3/2003 | Treyz et al. ............... 359/337.11 |
| 8,116,626 | B2 * | 2/2012 | Takeyama et al. ............. 398/34 |
| 8,542,992 | B2 * | 9/2013 | Jones et al. ..................... 398/30 |
| 2005/0286905 | A1 | 12/2005 | Mohs et al. |
| 2009/0297143 | A1 | 12/2009 | Takeyama et al. |

FOREIGN PATENT DOCUMENTS

| JP | 07-22683 | 1/1995 |
| JP | 08-316910 | 11/1996 |
| JP | 2002-353939 | 12/2002 |
| JP | 2008-504747 | 2/2008 |
| JP | 2009-290593 | 12/2009 |

OTHER PUBLICATIONS

Japanese Office Action issued Sep. 2, 2014 in corresponding Japanese patent application No. 2011-021364.

* cited by examiner

*Primary Examiner* — Ken Vanderpuye
*Assistant Examiner* — Jai Lee
(74) *Attorney, Agent, or Firm* — Staas & Halsey LLP

(57) ABSTRACT

An optical transmission apparatus includes an optical transmitter that outputs a signal light corresponding to a wavelength of a WDM light, a multiplexer that multiplexes lights input to the plurality of input ports, and that outputs a light generated through the multiplexing from the one or more output port, an optical amplifier that amplifies the light output from the multiplexer; and an amplified spontaneous emission (ASE) transmitter that inputs branching off part of the light output from the optical amplifier by a splitter and multiplexes, with the signal light, ASE in a wavelength band corresponding to an unused wavelength adjacent to the signal light included in the branched-off light.

11 Claims, 5 Drawing Sheets

OPTICAL TRANSMISSION APPARATUS AND OPTICAL TRANSMISSION SYSTEM

CROSS-REFERENCE TO RELATED APPLICATION

This application is based upon and claims the benefit of priority of the prior Japanese Patent Application No. 2011-021364, filed on Feb. 3, 2011, the entire contents of which are incorporated herein by reference.

FIELD

The embodiments discussed herein are related to an optical transmission apparatus and an optical transmission system to which a wavelength division multiplexing (WDM) technology is applied.

BACKGROUND

In recent years, along with the increasing information capacity, WDM optical transmission systems have been playing an important role in reducing the cost of systems. In a WDM optical transmission system, WDM light, which is generated by multiplexing a plurality of signal lights of different wavelengths, is transmitted in a multi-relay manner using optical amplifiers. A WDM optical transmission system may be further reduced in cost by using a configuration of nodes that is suitable for the intended application.

FIG. 1 illustrates an exemplary configuration of nodes in a typical WDM optical transmission system 100. The WDM optical transmission system 100 includes a plurality of nodes, that is, terminal stations 110 and 150, an optical add/drop multiplexing (OADM) station 130, and relay stations 120 and 140.

The terminal stations 110 and 150 are end nodes coupled to the two ends (transmission end and reception end) of a transmission path L along which a signal light is transmitted in a single direction. The terminal station 110 on the transmission side multiplexes, using a multiplexer 112, signal lights output from optical transmitters (TX) 111 corresponding to used wavelengths of a WDM light so as to generate a WDM light, amplifies the WDM light using an optical amplifier 113, and transmits the amplified WDM light along the transmission path L.

The terminal station 110 on the transmission side serves as a starting point of a propagation path (optical path) of signal lights corresponding to respective wavelengths. The terminal station 150 on the reception side amplifies, using an optical amplifier 151, the WDM light transmitted along the transmission path L, demultiplexes the WDM light into signal lights of respective wavelengths using a demultiplexer 152, and performs reception processing on the individual signal lights using corresponding optical receivers (RX) 153. The terminal station 150 on the reception side serves as an end point of the optical path.

The OADM station 130 is a node that is positioned along the transmission path L and that has an OADM function. The OADM station 130 amplifies, using a preamplifier (PreAMP) 131, the WDM light received through the transmission path L, demultiplexes the WDM light into signal lights of respective wavelengths using a demultiplexer 132, and supplies one or more signal lights (DROP) that are to be branched off at this node to one or more corresponding receivers (RX) 133.

In addition, the OADM station 130 multiplexes, using a multiplexer 135, the remaining signal lights (THRU) obtained through demultiplexing performed by the demultiplexer 132 and one or more signal lights (ADD) output from one or more corresponding transmitters (TX) 134 so as to generate a WDM light, amplifies the WDM light using a post amplifier (PostAMP) 136, and transmits the amplified WDM light along the transmission path L. The OADM station 130 may selectively serve as the starting or end point of the optical path, or a relay point for relaying a WDM light to the next node, depending on the individual wavelengths of the WDM light.

The relay stations 120 and 140 are optical relay nodes positioned along the transmission path L, and amplify a WDM light the optical level of which has been decreased by a loss characteristic of the transmission path L using inline amplifiers (In Line Amplifiers (ILAs)) 121 and 141, so as to compensate for the loss of the transmission path L. The relay stations 120 and 140 serve as relay points of the optical path corresponding to the individual wavelengths.

In WDM optical transmission systems of the above-described type, erbium-doped fiber amplifiers (EDFAs), which efficiently amplify a WDM light in a collective manner, are widely used as optical amplifiers provided in individual nodes. Regarding the EDFA, it is known that a physical phenomenon called polarization hole burning (PHB) occurs when a high-power signal light is input to an erbium-doped fiber (EDF). In PHB, the gain of a light containing polarized waves parallel to the polarization direction of the signal light is suppressed.

In the WDM optical transmission system, the number of wavelengths included in a WDM light may be arbitrarily set or controlled. When a signal light of a small number of wavelengths (for example, one wavelength) is transmitted, the degree of polarization of the transmitted light is higher than when a signal light of a large number of wavelengths is transmitted. If such signal light having a high degree of polarization is input to an EDFA, an optical signal to noise ratio (OSNR) of an amplified light is significantly degraded due to the occurrence of the above-described PHB.

That is, the gain with respect to a signal light having a high degree of polarization, and the gain with respect to amplified spontaneous emission (ASE) containing polarized waves parallel to the polarization direction of the signal light are suppressed by PHB. However, the gain with respect to ASE containing polarized waves perpendicular to the polarization direction of the signal light is relatively increased because the gain is not affected by PHB. As a result, compared to a case where PHB does not occur, the ratio of ASE containing polarized waves perpendicular to the polarization direction of signal light increases, and the OSNR is degraded.

Regarding the related art for suppressing the above-described degradation of the OSNR caused by PHB, Japanese Laid-open Patent Publications No. H07-22683 and No. H08-316910 disclose examples of the related art of changing the polarization state of a signal light input to an EDFA using modulation or the like and decreasing the degree of polarization of the signal light, so as to suppress the occurrence of PHB.

In addition, Japanese Laid-open Patent Publication No. 2009-290593 discloses an example of the related art of supplying, together with a signal light, ASE in a wavelength band corresponding to an unused wavelength adjacent to a used wavelength contained in ASE generated by a preamplifier of an OADM station to a post amplifier (EDFA), thereby decreasing the degree of polarization of a light input to the post amplifier so as to suppress the occurrence of PHB and to suppress the degradation of the OSNR.

The related art utilizing ASE does not directly change the polarization state of a signal light, but indirectly decreases the degree of polarization of the signal light by using non-polarized ASE at a neighboring unused wavelength, and thus may be realized with a simple configuration and has a small influence on a signal light.

However, it is basically difficult to apply the above-described examples of the related art utilizing ASE to a node other than an OADM station. That is, the suppression of PHB according to the related art is realized by decreasing the degree of polarization of light input to a downstream optical amplifier (EDFA) by using non-polarized ASE generated through amplification performed upstream.

Thus, in a node without an upstream source of ASE, such as the terminal station 110 on the transmission side in the WDM optical transmission system 100 illustrated in FIG. 1, for example, it is difficult to suppress the occurrence of PHB by applying the related art. Therefore, if a signal light having a high degree of polarization is input to an optical amplifier (EDFA) in a terminal station on the transmission side, the OSNR of the signal light output from the optical amplifier is inevitably degraded.

In particular, when many relay stations are provided in a section between the terminal station on the transmission side and an OADM station, PHB that occurs in the terminal station on the transmission side has an influence on the entire section, and thus the OSNR of the signal light is significantly degraded. That is, if the related art is applied to the node configuration illustrated in FIG. 1, the occurrence of PHB may be suppressed in the OADM station 130 and the nodes downstream of the OADM station 130, but degradation of the OSNR of a signal light caused by PHB may not be suppressed over the entire WDM optical transmission system 100.

SUMMARY

According to an aspect of an embodiment, an optical transmission apparatus includes an optical transmitter that outputs a signal light corresponding to a wavelength of a WDM light, a multiplexer that multiplexes lights input to the plurality of input ports, and that outputs a light generated through the multiplexing from the one or more output port, an optical amplifier that amplifies the light output from the multiplexer; and an amplified spontaneous emission (ASE) transmitter that inputs branching off part of the light output from the optical amplifier by a splitter and multiplexes, with the signal light, ASE in a wavelength band corresponding to an unused wavelength adjacent to the signal light included in the branched-off light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described in detail with reference to the drawings.

Figure 2:
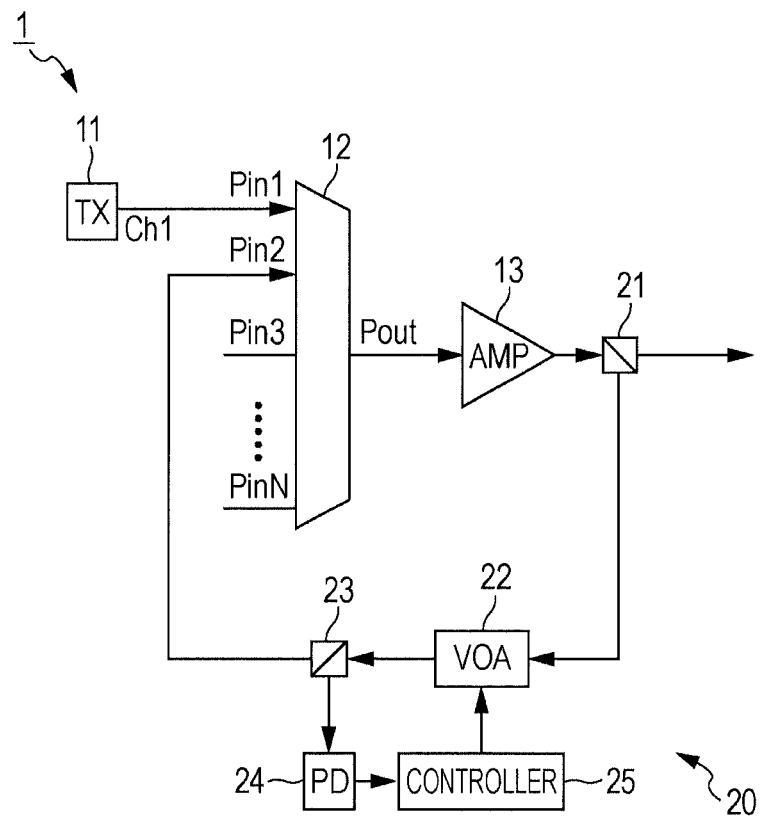
FIG. 2 illustrates a configuration of an optical transmission apparatus according to a first embodiment.

FIG. 2 illustrates a configuration of an optical transmission apparatus 1 according to a first embodiment.

Figure 1:
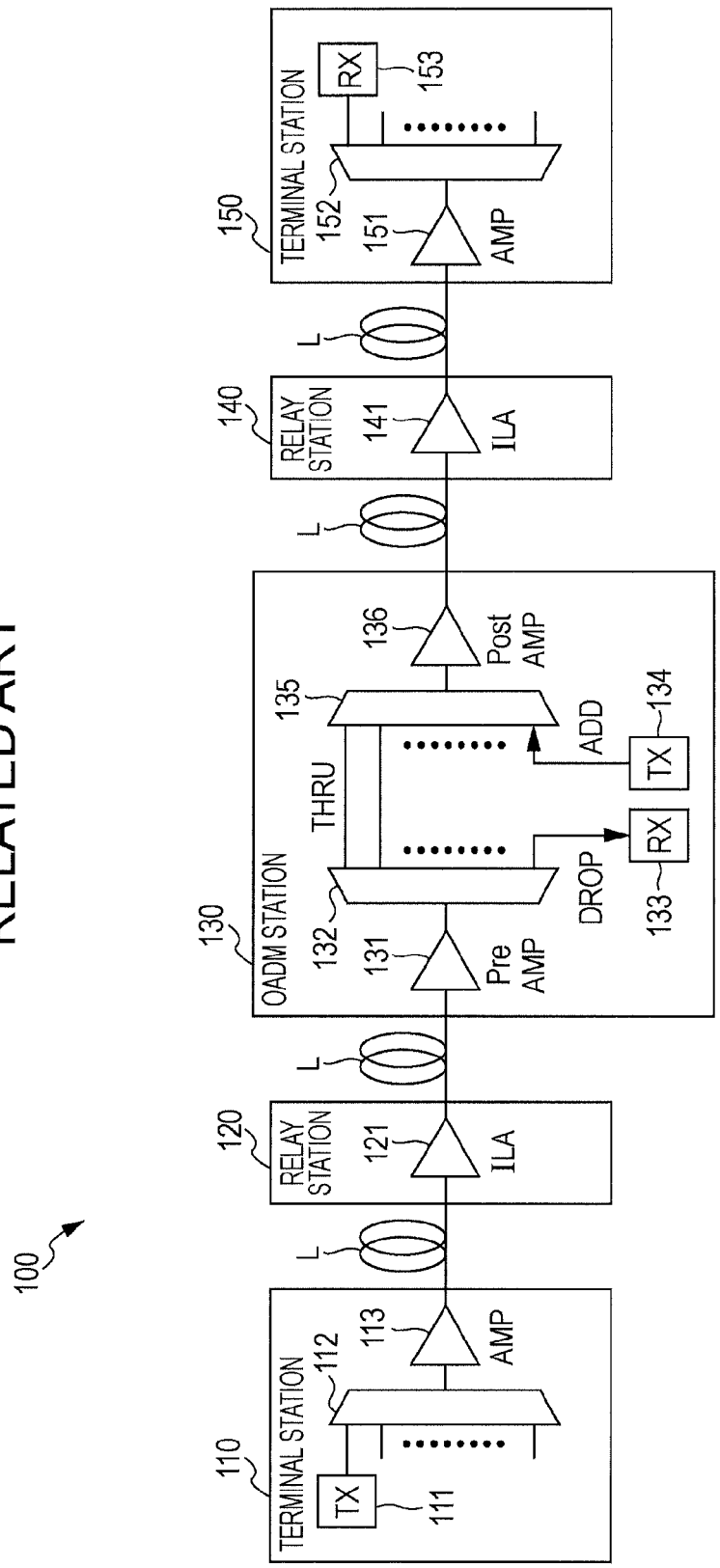
FIG. 1 illustrates an exemplary configuration of nodes in a typical WDM optical transmission system.

Referring to FIG. 2, the optical transmission apparatus 1 according to the first embodiment includes, for example, optical transmitters (TX) 11, a multiplexer 12, an optical amplifier (AMP) 13, and an amplified spontaneous emission (ASE) transmitter 20. The optical transmission apparatus 1 corresponds to the terminal station 110 on the transmission side in the typical wavelength division multiplexing (WDM) optical transmission system 100 illustrated in FIG. 1, and includes the ASE transmitter 20 in addition to the elements of the terminal station 110.

The ASE transmitter 20 serves as a path for supplying part of a light output from the optical amplifier 13 to an input port corresponding to an unused wavelength adjacent to a used wavelength among a plurality of input ports corresponding to individual wavelengths of the multiplexer 12. With the ASE transmitter 20, the optical transmission apparatus 1 decreases the degree of polarization of a light input to the optical amplifier 13 by using ASE generated in the optical amplifier 13, so as to suppress the occurrence of polarization hole burning (PHB).

Specifically, each of the optical transmitters 11 outputs a signal light having a high degree of polarization to the multiplexer 12, the signal light being generated by modulating a light of a certain wavelength in accordance with a known optical modulation method. A desired number of optical transmitters 11 are provided in accordance with the setting of the number of wavelengths of a WDM light output from the optical transmission apparatus 1. The output wavelengths of the respective optical transmitters 11 are set to values different from one another in accordance with the grid wavelengths of a WDM light.

The multiplexer 12 includes a plurality of input ports Pin1 to PinN corresponding to the maximum number of wavelengths N of a WDM light and one or more output port Pout, multiplexes lights input to the individual input ports Pin1 to PinN to generate a WDM light, and outputs the WDM light from the output port Pout to the optical amplifier 13.

Each of the input ports Pin1 to PinN of the multiplexer 12 has a pass band corresponding to a grid wavelength of the WDM light, and has a filter characteristic of leading only the component in the pass band to the output port Pout if a light in a band wider than the pass band is input to the input port. A multiplexer 12 is an arrayed waveguide grating (AWG), a wavelength selective switch or the like.

Regarding the connection of the optical transmitters 11 to the input ports Pin1 to PinN of the multiplexer 12, a WDM optical transmission system including the optical transmission apparatus 1 is normally operated by setting a decreased number of wavelengths of a WDM light when a communication demand is relatively low, for example, at the early installation of the system. Accordingly, the early installation cost of the system is reduced.

For example, when the system is operated by setting a single wavelength for WDM light, a single optical transmitter 11 corresponding to a wavelength Ch1 is provided in the optical transmission apparatus 1, and the optical transmitter 11 is coupled to the input port Pin1 corresponding to the wavelength Ch1 of the multiplexer 12 (see FIG. 2).

If the communication demand increases, one or more optical transmitters 11 are additionally provided. Accordingly, a configuration of a reduced cost is realized. In this operation form, an input port corresponding to an unused wavelength of the multiplexer 12 is normally vacant. Thus, when a small number of wavelengths are set, the degree of polarization of a light input to the optical amplifier 13 via the multiplexer 12 increases, and PHB occurs in the optical amplifier 13. In this embodiment, the ASE transmitter 20 is provided so that the occurrence of PHB may be suppressed when the number of set wavelengths is small.

The optical amplifier 13 is a typical erbium-doped optical fiber amplifier (EDFA) that amplifies a light output from the multiplexer 12. In an embodiment, the optical amplifier 13 undergoes uniform output control (automatic level control (ALC)) performed by a control circuit (not illustrated), in which the output power of a signal light per wavelength is maintained at a certain level.

The ASE transmitter 20 includes, for example, optical couplers (optical splitters) 21 and 23, a variable optical attenuator (VOA) 22, a photodiode (PD) 24, and a controller 25. The controller 25, 35 may include at least one of a circuit, a processor, a DSP (Digital Signal Processor) and a FPGA (Field-Programmable Gate Array). The VOA 22 performs control so that oscillation is not caused by a fed back ASE component of a wavelength.

The optical coupler 21 is coupled to the output terminal of the optical amplifier 13. The optical coupler 21 branches off part of a light output from the optical amplifier 13, that is, part of an amplified signal light and ASE in a wide band generated through the amplification, in accordance with a preset branching ratio to generate branched-off light, and transmits the branched-off light to the VOA 22.

The VOA 22 attenuates the branched-off light supplied from the optical coupler 21 in accordance with a variable optical attenuation amount controlled by the controller 25, and outputs the attenuated branched-off light. The light output from the VOA 22 is input via the optical coupler 23 to the input port corresponding to an unused wavelength adjacent to a used wavelength among the input ports Pin1 to PinN of the multiplexer 12.

Specifically, in the example illustrated in FIG. 2, only a signal light of the wavelength Ch1 is used. Since the unused wavelength adjacent to the wavelength Ch1 is a wavelength Ch2, the light output from the VOA 22 is input to the input port Pint corresponding to the wavelength Ch2 of the multiplexer 12.

The optical coupler 23 is coupled to the output terminal of the VOA 22, branches off part of light transmitted from the VOA 22 to the multiplexer 12, the part of light serving as monitored light, and outputs the monitored light to the PD 24. The PD 24 receives the monitored light from the optical coupler 23, generates an electric signal, the level of which changes in accordance with the power of the received light, and outputs the electric signal to the controller 25.

In this example described here, the optical coupler 23 is coupled to the output terminal of the VOA 22, and the power of light fed back to the multiplexer 12 is monitored. The position at which the optical power is monitored is not limited to the above-described example, and the optical power may be monitored at an arbitrary position in a feedback loop of ASE.

The controller 25 obtains, based on the electric signal output from the PD 24, the loop gain of ASE that is fed back, and controls the optical attenuation amount of the VOA 22 so that the loop gain becomes lower than 0 dB. The control performed on the VOA 22 by the controller 25 suppresses the oscillation of the optical amplifier 13. Alternatively, control may be performed so that the optical power detected by the PD 24 is at a target ASE level.

In the optical transmission apparatus 1 having the above-described configuration, a signal light output from the optical transmitter 11 corresponding to a used wavelength of a WDM light is supplied to the optical amplifier 13 via the multiplexer 12. As a specific example, it is assumed that a signal light is transmitted using only the wavelength Ch1 on the short wavelength side (near 1530 nm) in a C-band that is most significantly affected by PHB in the optical amplifier 13. Note that the wavelength of a signal light according to the embodiments is not limited to the above-described example.

In this case, a signal light of the wavelength Ch1 output from the optical transmitter 11 is input to the optical amplifier 13 after passing the input port Pin1 and the output port Pout of the multiplexer 12, and is amplified to a desired level by the optical amplifier 13 that performs an ALC operation. At this time, ASE in a wide band including the signal wavelength is generated in the optical amplifier 13, and the ASE is output together with the amplified signal light.

The light output from the optical amplifier 13 is transmitted along the transmission path L (see FIG. 1) coupled to the optical transmission apparatus 1, and part of the light is branched off by the optical coupler 21 of the ASE transmitter 20, so that branched-off light is generated. The branched-off light passes the VOA 22 and the optical coupler 23 and is supplied to the input port Pin2 corresponding to the unused wavelength Ch2 adjacent to the used wavelength Ch1 of the multiplexer 12.

The input port Pin2 of the multiplexer 12 has a pass band corresponding to the unused wavelength Ch2, and only the ASE included in the pass band is led to the output port Pout. That is, in the light returned to the input port Pin2 of the multiplexer 12 (part of the light output from the optical amplifier 13), the signal light and ASE outside the pass band of the input port Pin2 are removed, and the ASE in the pass band is multiplexed with the signal light of the wavelength Ch1. The resulting light is output from the output port Pout to the optical amplifier 13. Accordingly, a feedback loop for the ASE in the wavelength band corresponding to the unused wavelength Ch2 adjacent to the used wavelength Ch1 is formed.

With the use of the feedback loop, the amplification operation of the optical amplifier 13 is controlled using ALC so that an output level becomes uniform in a signal communication state of two wavelengths corresponding to the wavelengths Ch1 and Ch2. In addition, the controller 25 controls the VOA 22 in order to suppress uncontrollability of the optical amplifier 13 due to oscillation of the feedback loop of ASE.

In the control of the VOA 22, the power of light propagating along the feedback loop (the light output from the VOA 22 in the example in FIG. 2) is monitored by using the optical coupler 23 and the PD 24, and the controller 25 obtains the loop gain using the monitoring result. The controller 25 controls the optical attenuation amount in the VOA 22 so that the loop gain becomes lower than 0 dB.

Figure 3:
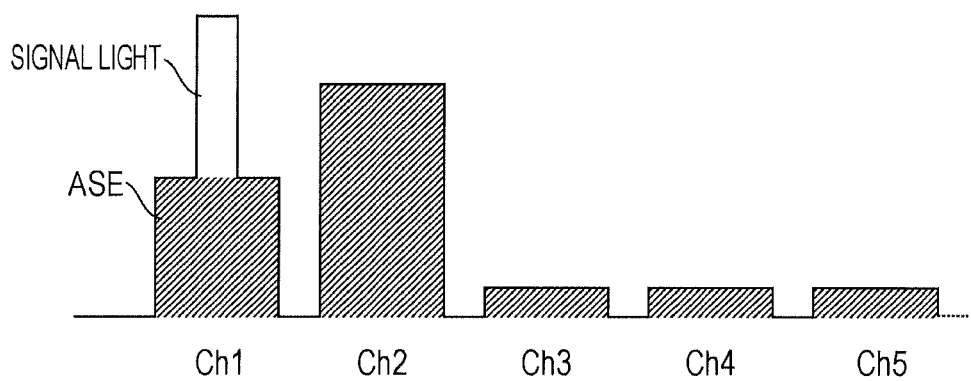
FIG. 3 schematically illustrates the spectrum of light output from an optical amplifier according to the first embodiment.

As a result of controlling the optical amplifier 13 and the VOA 22 in the above-described manner, the power of ASE in the wavelength band corresponding to the unused wavelength Ch2 increases to the level corresponding to the level of transmitting signals of two wavelengths. FIG. 3 schematically illustrates the spectrum of the light output from the optical amplifier 13. The power of ASE corresponding to the wavelength Ch2 (the area of a shaded part corresponding to Ch2 in FIG. 3) is at a level equivalent to the level of the power of signal light and ASE corresponding to the wavelength Ch1.

Therefore, the light output from the output port Pout of the multiplexer 12 and input to the optical amplifier 13 contains ASE corresponding to the wavelength Ch2.

Thus, even if the signal light of the wavelength Ch1 has a high degree of polarization, the degree of polarization of the light input to the optical amplifier 13 is decreased because non-polarized ASE having power equivalent to the signal light exists in the wavelength band adjacent to the wavelength of the signal light.

Accordingly, even when transmitting signal light of a small number of wavelengths, the optical transmission apparatus 1 may suppress the occurrence of PHB in the optical amplifier 13, and thus may suppress degradation of the OSNR caused by PHB, which occurs in the related art.

Next, an optical transmission apparatus 2 according to a second embodiment will be described.

Figure 4:
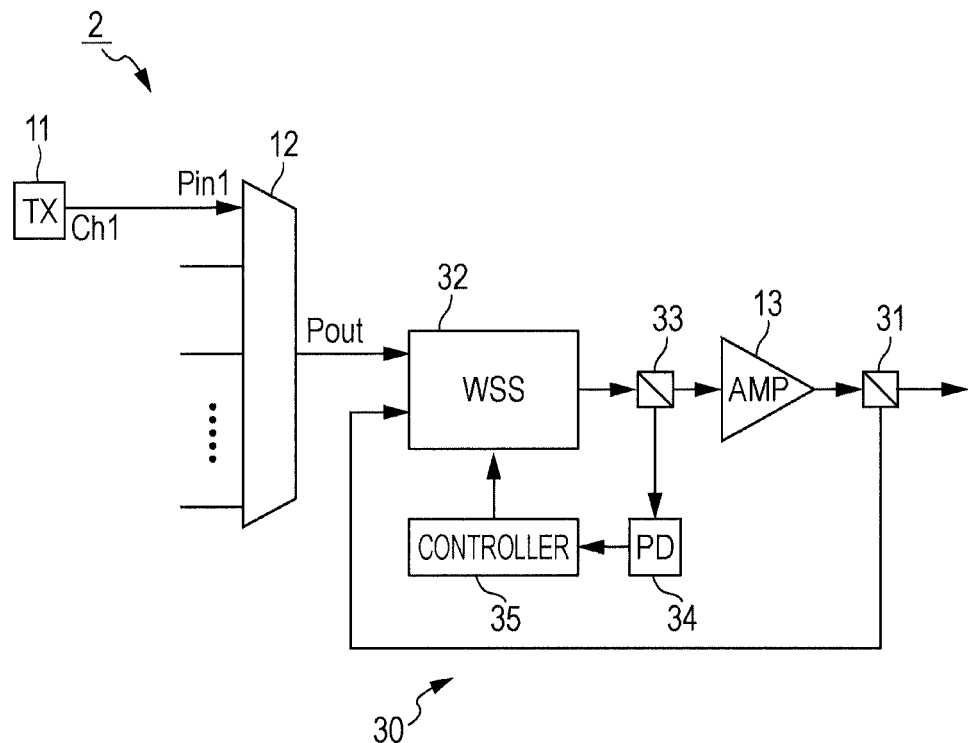
FIG. 4 illustrates a configuration of an optical transmission apparatus according to a second embodiment.

FIG. 4 is a block diagram illustrating a configuration of the optical transmission apparatus 2 according to the second embodiment. The optical transmission apparatus 2 includes an ASE transmitter 30 that multiplexes a signal light and ASE using a wavelength selective switch (WSS), instead of the ASE transmitter 20, which feeds back ASE generated in the optical amplifier 13 to the multiplexer 12 and causes the ASE to be multiplexed with signal light, in the optical transmission apparatus 1 according to the first embodiment.

The configuration of the optical transmission apparatus 2 is similar to the configuration of the optical transmission apparatus 1 according to the first embodiment except the ASE transmitter 30. Thus, the corresponding parts are denoted by the same reference numerals and the description thereof is omitted.

The ASE transmitter 30 includes, for example, optical couplers 31 and 33, a WSS 32, a photodiode (PD) 34, and a controller 35.

The optical coupler 31 is coupled to the output terminal of the optical amplifier 13, branches off part of light output from the optical amplifier 13 (amplified signal light and wideband ASE generated through the amplification) in accordance with a preset branching ratio to generate branched-off light, and transmits the branched-off light to the WSS 32.

The WSS 32 is a known optical device that includes at least two input terminals and one output terminal and that may selectively couple light input to each of the input terminals to the output terminal in accordance with the wavelength component contained in the light. Here, the light output from the output port Pout of the multiplexer 12 is supplied to one of the input terminals of the WSS 32, and the light branched off by the optical coupler 31 is supplied to the other input terminal of the WSS 32.

The light output from the output terminal of the WSS 32 is supplied to the optical amplifier 13 via the optical coupler 33. The wavelength of the light selected in the WSS 32 and the coupling power of the light to the output terminal are variably controlled by adjusting, for example, the angle of a reflective surface of a movable mirror (not illustrated) provided in the WSS 32 in association with individual wavelengths in accordance with an output signal from the controller 35.

The optical coupler 33 is coupled to the output terminal of the WSS 32, branches off part of the light transmitted from the WSS 32 to the optical amplifier 13, the part of the light serving as monitored light, and outputs the monitored light to the PD 34, for example. The PD 34 receives the monitored light from the optical coupler 33, generates an electric signal, the level of which changes in accordance with the power of the received light, and outputs the electric signal to the controller 35.

In this example described here, the optical coupler 33 is coupled to the output terminal of the WSS 32, but the position of the optical coupler 33 is not limited to this example. Like the optical coupler 23 according to the first embodiment, the optical coupler 33 may be placed at an arbitrary position in the feedback loop of ASE.

The controller 35 controls the wavelength of the light selected in the WSS 32 in accordance with information about a used wavelength of WDM light, obtains, based on the electric signal output from the PD 34, the loop gain of ASE that is fed back, and controls the coupling power of the light selected in the WSS 32 to the output terminal so that the loop gain becomes lower than 0 dB.

As a result of the control performed on the WSS 32 by the controller 35, ASE in a wavelength band corresponding to an unused wavelength adjacent to a used wavelength in ASE in a wideband generated in the optical amplifier 13 is multiplexed with signal light of the used wavelength and is input to the optical amplifier 13, and the oscillation of the optical amplifier 13 is suppressed.

In the optical transmission apparatus 2 having the above-described configuration, it is assumed, as in the first embodiment, that signal light is transmitted using only the wavelength Ch1 on the short wavelength side (near 1530 nm) in a C-band that is most significantly affected by PHB in the optical amplifier 13. In this case, the signal light of the wavelength Ch1 output from the optical transmitter 11 passes the multiplexer 12 and is supplied to one of the input terminals of the WSS 32.

In the WSS 32, the signal light supplied to one of the input terminals is led with maximum coupling power to the output terminal. The signal light that has passed the WSS 32 is input to the optical amplifier 13 via the optical coupler 33, and is amplified to a desired level by the optical amplifier 13 that performs an ALC operation. At this time, ASE in a wideband including the signal wavelength is generated in the optical amplifier 13, and the ASE is output together with the amplified signal light.

The light output from the optical amplifier 13 is transmitted along the transmission path L (see FIG. 1) coupled to the optical transmission apparatus 2. Part of the light is branched off by the optical coupler 31 in the ASE transmitter 30, and is supplied to the other input terminal of the WSS 32. In the WSS 32, ASE in the wavelength band corresponding to the unused wavelength Ch2 adjacent to the wavelength Ch1 is selected from the light input to the other input terminal, and the selected ASE is coupled to the output terminal.

Furthermore, the wavelength selected in the WSS 32 is controlled by the controller 35 so that ASE in the wavelength band corresponding to an unused wavelength Ch3 is also coupled to the output terminal, using a characteristic in which the WSS 32 may select the wavelength band corresponding to an arbitrary wavelength.

As a result, ASE corresponding to the wavelengths Ch2 and Ch3 is multiplexed with the signal light of the wavelength Ch1, and the resulting light is output from the output terminal of the WSS 32 toward the optical amplifier 13. Accordingly, a feedback loop of the ASE in the wavelength band corresponding to the unused wavelengths Ch2 and Ch3 adjacent to the used wavelength Ch1 is formed.

With the use of the feedback loop, the amplification operation of the optical amplifier 13 is controlled using ALC so that an output level becomes uniform in a signal communication state of two wavelengths, as in the first embodiment. Here, feedback of ASE is performed for the two wavelengths Ch2 and Ch3.

Figure 5:
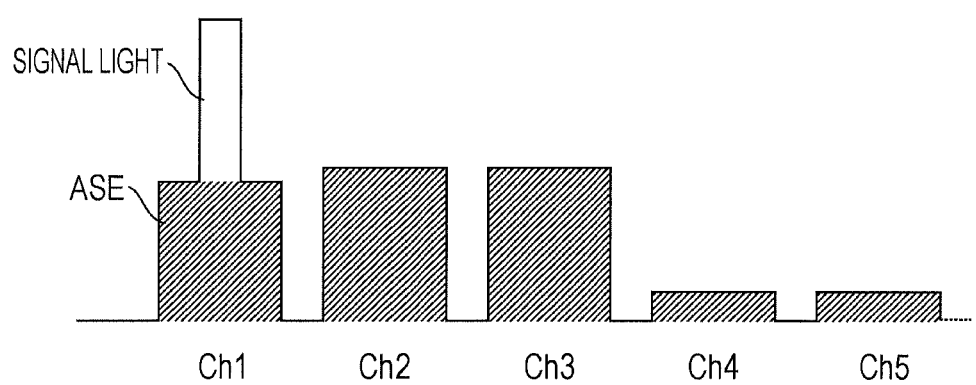
FIG. 5 schematically illustrates the spectrum of light output from an optical amplifier according to the second embodiment.

Thus, as illustrated in FIG. 5, the sum of the power of the ASE corresponding to the individual wavelengths Ch2 and Ch3 becomes equivalent to the power of the signal light and ASE corresponding to the wavelength Ch1. Accordingly, the degree of polarization of light input to the optical amplifier 13 may be decreased while decreasing the level of the ASE of the wavelength Ch2 that is the closest to the signal light of the wavelength Ch1. Thus, crosstalk or the like between the signal light of the wavelength Ch1 and the ASE of the wavelength Ch2 is less likely to occur.

In addition, the controller 35 controls the WSS 32 in order to suppress uncontrollability of the optical amplifier 13 due to oscillation of the feedback loop of ASE.

In the control of the WSS 32, the power of light propagating along the feedback loop (the light output from the WSS 32 in the example in FIG. 4) is monitored by using the optical coupler 33 and the PD 34, and the controller 35 obtains the loop gain of the ASE using the monitoring result. The controller 35 controls the coupling power of ASE selected in the WSS 32 to the output terminal so that the loop gain becomes lower than 0 dB.

As a result of controlling the optical amplifier 13 and the WSS 32 in the above-described manner, the light input from the WSS 32 to the optical amplifier 13 via the optical coupler 33 contains the ASE corresponding to the individual wavelengths Ch2 and Ch3.

Thus, even if the signal light of the wavelength Ch1 has a high degree of polarization, the degree of polarization of the light input to the optical amplifier 13 is decreased because non-polarized ASE having power equivalent to the signal light exists in the wavelength band adjacent to the wavelength of the signal light. Accordingly, even when transmitting signal light of a small number of wavelengths, the optical transmission apparatus 2 may suppress the occurrence of PHB in the optical amplifier 13, and thus may suppress degradation of the OSNR caused by PHB, which occurs in the related art.

Further, in the optical transmission apparatus 2, the ASE corresponding to the plurality of unused wavelengths Ch2 and Ch3 is selected in the WSS 32 and is fed back, thereby decreasing the ASE level of the wavelength Ch2 that is the closest to the signal light. Accordingly, crosstalk or the like between the signal light and the ASE may be reduced.

According to the second embodiment, the ASE in the wavelength band corresponding to the unused wavelengths Ch2 and Ch3 is selected in the WSS 32. The wavelength band of the ASE selected in the WSS 32 may be appropriately set in view of the wavelength interval of WDM light and a wavelength range in which the gain of the optical amplifier 13 is substantially decreased by PHB with respect to the wavelength of signal light.

Next, an optical transmission apparatus 3 according to a third embodiment will be described.

Figure 6:
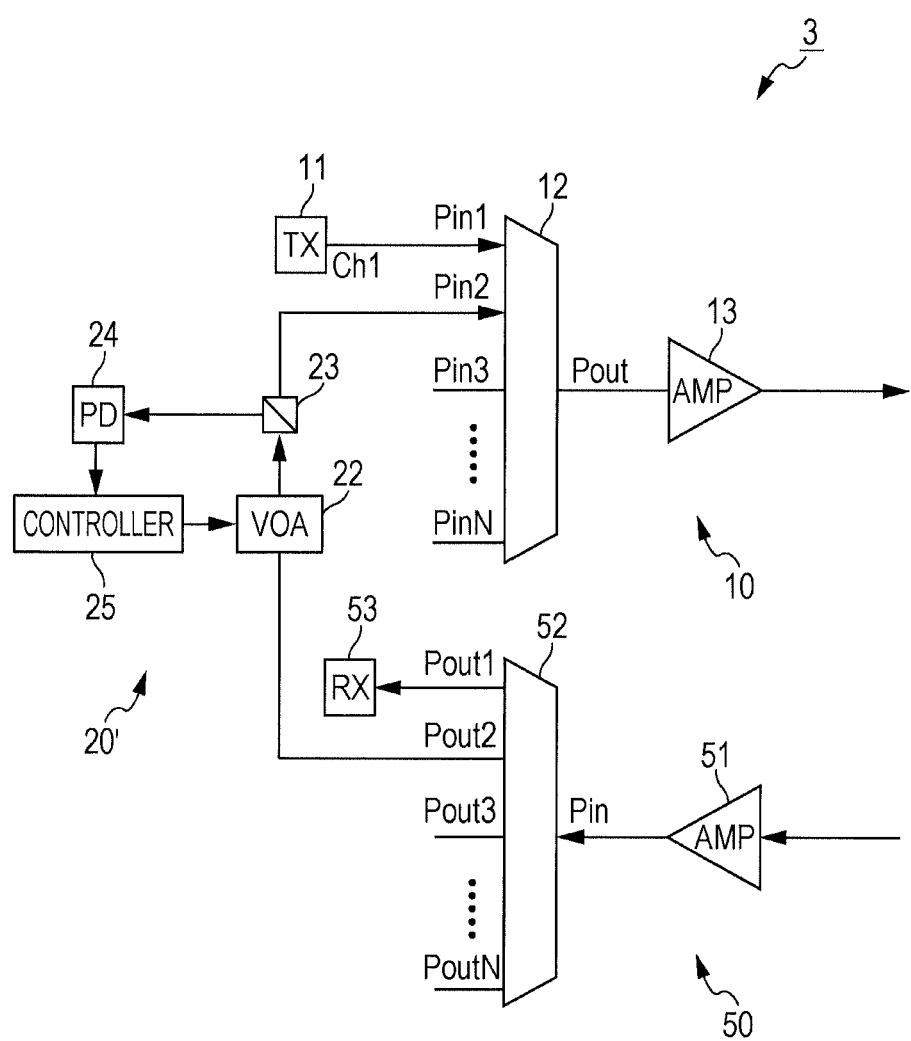
FIG. 6 illustrates a configuration of an optical transmission apparatus according to a third embodiment.

FIG. 6 is a block diagram illustrating a configuration of the optical transmission apparatus 3 according to the third embodiment. The optical transmission apparatus 3 includes a transmission unit 10, a reception unit 50, and an ASE transmitter 20', and functions as a terminal station coupled to one end of a transmission path (not illustrated) along which WDM light is transmitted in two directions.

The transmission unit 10 includes optical transmitters 11, a multiplexer 12, and an optical amplifier 13 that are similar to those in the first embodiment.

The reception unit 50 includes, for example, an optical amplifier 51, a demultiplexer 52, and an optical receiver (RX) 53. The optical amplifier 51 amplifies WDM light received through a transmission path and outputs the amplified WDM light to the demultiplexer 52.

The demultiplexer 52 includes one input port Pin and a plurality of output ports Pout1 to PoutN corresponding to the maximum number of wavelengths N of WDM light, demultiplexes the light input to the input port Pin in accordance with wavelengths, and outputs individual lights obtained through the demultiplexing from the respective output ports Pout1 to PoutN.

The optical receiver 53 is coupled to the output port corresponding to a used wavelength (the output port Pout1 in the example in FIG. 6) among the plurality of output ports Pout1 to PoutN of the demultiplexer 52, and receives the signal light output from the demultiplexer 52. The used wavelength of WDM light set on the reception side is the same as the wavelength set on the transmission side.

The ASE transmitter 20' serves as a path for taking light output from the output port Pout2 corresponding to the unused wavelength Ch2 adjacent to the used wavelength Ch1 among the plurality of output ports Pout1 to PoutN of the demultiplexer 52 in the reception unit 50, and supplying the light output from the demultiplexer 52 to the input port Pint corresponding to the unused wavelength Ch2 adjacent to the used wavelength Ch1 among the plurality of input ports Pin1 to PinN of the multiplexer 12 in the transmission unit 10. A VOA 22, an optical coupler 23, a PD 24, and a controller 25 that are similar to those in the ASE transmitter 20 according to the first embodiment are provided in the path.

In the optical transmission apparatus 3 having the above-described configuration, the light supplied to the input port Pin of the demultiplexer 52 in the reception unit 50 contains the signal light amplified by the optical amplifier 51 and ASE in a wide band. Furthermore, when an optical amplifier is provided along the transmission path coupled to the reception unit 50, the light supplied to the input port Pin contains ASE that is generated and stored in the upstream optical amplifier.

The ASE transmitter 20' uses the ASE contained in the light input to the demultiplexer 52 to take, from the output port Pout2 of the demultiplexer 52, ASE in the wavelength band corresponding to the unused wavelength Ch2 adjacent to the used wavelength Ch1 contained in the ASE. Then, in the ASE transmitter 20', the taken ASE is supplied to the VOA 22, the optical attenuation amount of the VOA 22 is controlled by the controller 25 so that the power of the ASE becomes equivalent to the power of the signal light output from the optical transmitter 11 in the transmission unit 10, and the light output from the VOA 22 is supplied to the input port Pin2 of the multiplexer 12 in the transmission unit 10.

Accordingly, even if the signal light of the wavelength Ch1 has a high degree of polarization, the degree of polarization of the light output from the output port Pout of the multiplexer 12 in the transmission unit 10 and is input to the optical amplifier 13 is decreased because non-polarized ASE having power equivalent to the power of signal light exists in the wavelength band adjacent to the wavelength of the signal light.

Thus, an effect similar to that in the first embodiment may be obtained in the optical transmission apparatus 3 in which ASE on the reception side in the same apparatus is used.

Next, an optical transmission apparatus 4 according to a fourth embodiment will be described.

Figure 7:
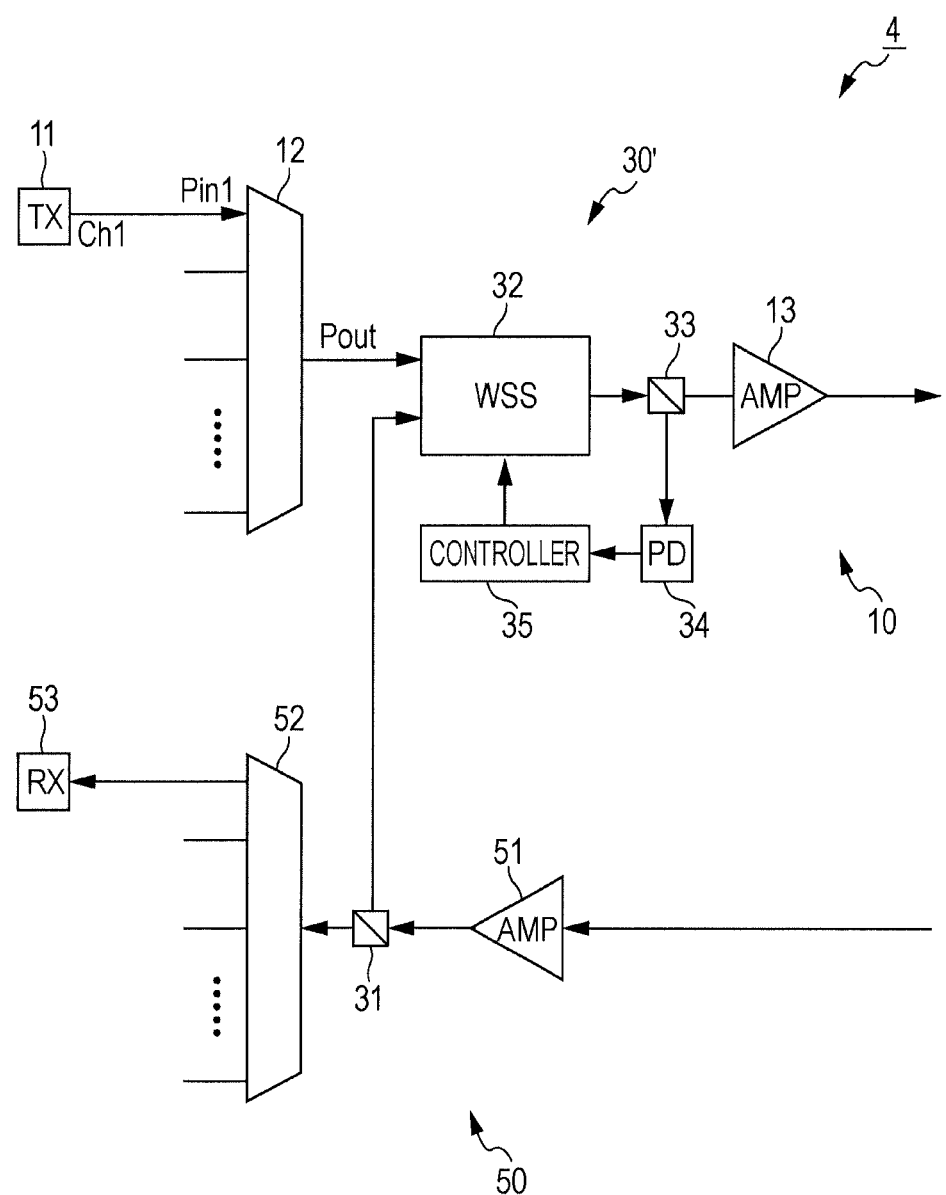
FIG. 7 illustrates a configuration of an optical transmission apparatus according to a fourth embodiment.

FIG. 7 is a block diagram illustrating a configuration of the optical transmission apparatus 4 according to the fourth embodiment. The optical transmission apparatus 4 includes a transmission unit 10 and a reception unit 50 that are similar to those in the third embodiment, and an ASE transmitter 30', and functions as a terminal station coupled to one end of a transmission path (not illustrated) along which WDM light is transmitted in two directions.

The ASE transmitter 30' serves as a path for branching off, using an optical coupler 31 provided between an optical amplifier 51 and a demultiplexer 52 in the reception unit 50, part of light output from the optical amplifier 51 to generate branched-off light, and supplying the branched-off light to a WSS 32 provided between a multiplexer 12 and an optical amplifier 13 in the transmission unit 10. The WSS 32, an optical coupler 33 for controlling the operation of the WSS 32, a PD 34, and a controller 35 in the ASE transmitter 30' have configurations similar to those in the ASE transmitter 30 according to the second embodiment.

In the optical transmission apparatus 4 having the above-described configuration, the light output from the optical amplifier 51 in the reception unit 50 includes the signal light amplified by the optical amplifier 51 and ASE in a wide band. Furthermore, when an optical amplifier is provided along the transmission path coupled to the reception unit 50, the light output from the optical amplifier 51 contains ASE that is generated and stored in the upstream optical amplifier.

In the ASE transmitter 30', part of the light output from the optical amplifier 51 is supplied to the WSS 32. In the WSS 32, ASE in the wavelength band corresponding to the unused wavelengths Ch2 and Ch3 adjacent to the used wavelength Ch1 is selectively multiplexed with signal light, as in the second embodiment.

Accordingly, even if the signal light of the wavelength Ch1 has a high degree of polarization, the degree of polarization of the light input from the WSS 32 on the transmission side to the optical amplifier 13 via the optical coupler 33 is decreased because non-polarized ASE having power equivalent to the power of signal light exists in the wavelength band adjacent to the wavelength of the signal light.

Thus, an effect similar to that in the second embodiment may be obtained in the optical transmission apparatus 4 in which ASE on the reception side in the same apparatus is used.

In the above-described first to fourth embodiments, a used wavelength of WDM light is set at one end of a signal wavelength band, and an unused wavelength adjacent to the used wavelength exists on only one side of the used wavelength.

When a used wavelength is set at a position other than the two ends of the signal wavelength band, ASE in the wavelength band corresponding to any one of or both of unused wavelengths adjacent on the short wavelength side and long wavelength side of the used wavelength may be multiplexed with signal light.

According to the above-described optical transmission apparatuses, even when signal light of a small number of wavelengths is transmitted, the light input to an optical amplifier contains ASE in the wavelength band corresponding to an unused wavelength adjacent to a used wavelength of WDM light. Accordingly, the degree of polarization of light input to the optical amplifier is decreased and the occurrence of PHB may be suppressed, and degradation of the OSNR of signal light caused by PHB may be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has(have) been described in detail, it should be understood that the various changes, substitutions, and alterations could be made hereto without departing from the spirit and scope of the invention.

What is claimed is:

1. An optical transmission apparatus comprising:
an optical transmitter that outputs a signal light corresponding to a wavelength of a WDM light;
a multiplexer that multiplexes lights input to a plurality of input ports, and that outputs a light generated through the multiplexing from the one or more output port;
an optical amplifier that amplifies the light output from the multiplexer; and
an amplified spontaneous emission (ASE) transmitter that inputs branching off part of the light output from the optical amplifier by a splitter, and multiplexes, with the signal light, ASE in a wavelength band corresponding to an unused wavelength adjacent to the signal light included in the branched-off light.

2. An optical transmission apparatus comprising:
an optical transmitter that outputs signal light corresponding to a wavelength of a WDM light;
a multiplexer that includes a plurality of input ports and one or more output port, the signal light output from the optical transmitter being supplied to an input port corresponding to the wavelength of the WDM light among the plurality of input ports, that multiplexes lights input to the plurality of input ports, and that outputs light generated through the multiplexing from the one or more output port;
an optical amplifier that amplifies the light output from the multiplexer; and
an amplified spontaneous emission (ASE) transmitter that serves as a path for branching off part of the light output from the optical amplifier to generate branched-off light, and multiplexing, with signal light which propagates between the optical transmitter and the optical amplifier, ASE in a wavelength band corresponding to an unused wavelength adjacent to the used wavelength of the WDM light contained in ASE included in the branched-off light.

3. The optical transmission apparatus according to claim 2, wherein the ASE transmitter includes
an optical coupler that is coupled to an output terminal of the optical amplifier and that branches off part of the light output from the optical amplifier to generate branched-off light, and
an optical power controller that controls power of the branched-off light and that supplies the branched-off light the power of which has been controlled to an input port corresponding to the unused wavelength adjacent to the used wavelength of the WDM light among the plurality of input ports of the multiplexer.

4. The optical transmission apparatus according to claim 3, wherein the optical power controller includes
a variable optical attenuator that receives the branched-off light, that adjusts power of the received branched-off light in accordance with a variable optical attenuation amount, and that supplies the branched-off light the power of which has been adjusted to the input port corresponding to the unused wavelength of the multiplexer, a monitor that monitors power of light which propagates along a feedback loop of the ASE, the feedback loop including the variable optical attenuator, and a controller that obtains, based on the power monitored by the monitor, a loop gain of the ASE which is fed back, and that controls the optical attenuation amount of the variable optical attenuator so that the loop gain becomes lower than 0 dB or is equal to or smaller than given optical power.

5. An optical transmission apparatus comprising: an optical transmitter that outputs a signal light corresponding to a wavelength of a WDM light;

a multiplexer that multiplexes lights input to a plurality of input ports, and that outputs a light generated through the multiplexing from one or more output ports;

an optical amplifier that amplifies the light output from the multiplexer;

an optical coupler that is coupled to an output terminal of the optical amplifier and that branches off part of the light output from the optical amplifier to generate branched-off light;

a wavelength selective switch that includes at least two input terminals and one output terminal, the light output from the multiplexer being supplied to one of the input terminals, the branched-off light being supplied to the other input terminal, that selectively couples light supplied to each of the input terminals to the output terminal in accordance with a wavelength component contained in the light, and that supplies the light coupled to the output terminal to the optical amplifier; and a controller that controls operation of the wavelength selective switch so that signal light supplied to one of the input terminals of the wavelength selective switch and ASE in a wavelength band corresponding to an unused wavelength adjacent to an used wavelength of the WDM light contained in ASE included in light supplied to the other input terminal of the wavelength selective switch are coupled to the output terminal of the wavelength selective switch.

6. The optical transmission apparatus according to claim 5, wherein the controller controls the operation of the wavelength selective switch so that ASE in a wavelength band corresponding to a plurality of unused wavelengths adjacent to the used wavelength of the WDM light is coupled to the output terminal of the wavelength selective switch.

7. The optical transmission apparatus according to claim 5, wherein the controller includes a monitor that monitors power of light which propagates along a feedback loop of the ASE, the feedback loop including the wavelength selective switch, and a controller that controls a wavelength band of the signal light and the ASE selected by the wavelength selective switch in accordance with information about the used wavelength of the WDM light, that obtains, based on the power monitored by the monitor, a loop gain of the ASE which is fed back, and that controls power of coupling of the ASE to the output terminal in the wavelength selective switch so that the loop gain becomes lower than 0 dB.

8. An optical transmission apparatus for transmitting and receiving WDM light that is generated by multiplexing a plurality of signal lights of different wavelengths, the optical transmission apparatus comprising:

an optical transmitter that outputs a signal light corresponding to a used wavelength of the WDM light;

a multiplexer that includes a plurality of input ports and one or more output port, the signal light output from the optical transmitter being supplied to an input port corresponding to the used wavelength of the WDM light among the plurality of input ports, that multiplexes signal lights input to the plurality of input ports, and that outputs light generated through the multiplexing from the output port;

a first optical amplifier that amplifies the light output from the multiplexer and transmits the amplified light to an outside;

a second optical amplifier that amplifies WDM light received from the outside;

a demultiplexer that includes one input port and a plurality of output ports, the light output from the second optical amplifier being supplied to the input port, that demultiplexes the light in accordance with wavelengths, and that outputs lights generated through the demultiplexing from the plurality of output ports;

an optical receiver that is coupled to an output port corresponding to the used wavelength of the WDM light among the plurality of output ports of the demultiplexer and that performs reception processing on signal light output from the demultiplexer; and an ASE transmitter that serves as a path for multiplexing, with signal light which propagates between the optical transmitter and the first optical amplifier, ASE in a wavelength band corresponding to an unused wavelength adjacent to the used wavelength of the WDM light contained in ASE included in the light output from the second optical amplifier.

9. The optical transmission apparatus according to claim 8, wherein the ASE transmitter includes an optical power controller that controls power of light output from an output port corresponding to the unused wavelength adjacent to the used wavelength of the WDM light among the plurality of output ports of the demultiplexer, and that supplies the light the power of which has been controlled to an input port corresponding to the unused wavelength adjacent to the used wavelength of the WDM light among the plurality of input ports of the multiplexer.

10. The optical transmission apparatus according to claim 9, wherein the optical power controller receives the light output from the output port corresponding to the unused wavelength of the demultiplexer, and includes a variable optical attenuator that adjusts power of the received light in accordance with a variable optical attenuation amount and that supplies the light the power of which has been adjusted to the input port corresponding to the unused wavelength of the multiplexer, a monitor that monitors power of light which propagates along a path extending from the demultiplexer to the multiplexer via the variable optical attenuator, and a controller that controls, based on the power monitored by the monitor, the optical attenuation amount of the variable optical attenuator so that power of the ASE supplied to the multiplexer has a level equivalent to a level of power of signal light output from the optical transmitter.

11. The optical transmission apparatus according to claim 2, wherein the optical transmission apparatus is coupled to an end of a transmission path.

* * * * *